United States Patent [19]
Kennedy et al.

[11] Patent Number: 5,799,060
[45] Date of Patent: Aug. 25, 1998

[54] MULTI-PORT CALLER ID-BASED TELEPHONE RINGBACK TEST DEVICE

[75] Inventors: Michael Kennedy, Ventura, Calif.; Joseph A. Potts, Jr., Marlton, N.J.

[73] Assignee: Harris Corporation, Melbourne, Fla.

[21] Appl. No.: 648,738

[22] Filed: May 16, 1996

[51] Int. Cl.⁶ .......................... H04M 1/24; H04M 3/08; H04M 1/56; H04M 15/06
[52] U.S. Cl. .......................... 379/29; 379/21; 379/142
[58] Field of Search .......................... 379/21, 22, 23, 379/24, 27, 29, 30, 32, 142

[56] References Cited

U.S. PATENT DOCUMENTS

| | | | |
|---|---|---|---|
| 4,764,949 | 8/1988 | Faith et al. | 379/27 |
| 4,777,645 | 10/1988 | Faith et al. | 379/21 |
| 5,583,912 | 12/1996 | Schillaci et al. | 379/21 |

*Primary Examiner*—Paul Loomis
*Attorney, Agent, or Firm*—Charles E. Wands

[57] ABSTRACT

A multi-ported, caller ID-based test unit, which may be installed in the central office of a public switched telephone network, is capable of determining the telephone number, subscriber name and various other information associated with the subscriber line used to access to the test device, and is operative to conduct various tests of a telephone circuit from which a call to the test device is placed. These tests include exercising a caller identification, call waiting class of service, testing the ability of the telephone circuit to receive incoming calls, and testing the operation of a message-waiting indicator of a telephone unit coupled to the telephone circuit, as well as the ability to conduct a data session with a remote terminal using the test unit's data port.

37 Claims, 6 Drawing Sheets

MULTI-PORT CALLER ID-BASED TELEPHONE RINGBACK TEST DEVICE

CROSS-REFERENCE TO RELATED APPLICATIONS

The present invention relates to subject matter disclosed in co-pending application Ser. No. 08/344,698 (hereinafter referred to as the '698 application), filed Nov. 18, 1994, by David W. Keefe et al, entitled: "TELEPHONE RINGBACK TEST DEVICE AND METHOD," assigned to the assignee of the present application, and the disclosure of which is incorporated herein.

FIELD OF THE INVENTION

The present invention relates in general to communication systems, and is particularly directed to a public switched telephone network (PSTN), central office-installable test unit and a method of operation, which is capable of testing a subscriber's telephone circuit through the use of caller identification ("caller ID") information available through the telephone network to effect a ringback call to the subscriber circuit. The test device of the invention is capable of determining the telephone number, subscriber name and various other information associated with the subscriber line used to access to the test device, and is operative to conduct various tests of a telephone circuit from which a call to the test device is placed. These tests include exercising a call identification, call waiting class of service, testing the ability of the telephone circuit to receive incoming calls, and testing the operation of a message-waiting indicator of a telephone unit coupled to the telephone circuit.

BACKGROUND OF THE INVENTION

As described in the above-referenced '698 application, one of the mechanisms employed in the telephone industry to test a subscriber's line circuit installed in a public switched telephone network involves the use of a ringback testing device that is resident in the central office. Referring to the simplified diagrammatic illustration of a telephone network in FIG. 1, a ringback test device 10 within a telephone network central office 16 is accessible by a subscriber's handset 12 or a craftsperson's test set 14, in order to 'ring back' the caller's telephone number after the caller goes on hook. This ringback operation serves to verify continuity and operation of dial-up lines between the telephone central office and the caller, thus providing a relatively complete test of a circuit from the caller's connection through the PSTN circuit, including office equipment (OE) in the telephone central office capable of providing telephone service and back to the caller's connection.

One type of prior art ringback test device employed for this purpose is described in the U.S. Pat. No. 4,764,949 issued Aug. 18, 1988 to Richard Faith, et al. (hereinafter referred to as the '949 patent), assigned to the assignee hereof, and the disclosure of which is incorporated herein. The ringback test device of the '949 patent is designed to address the fact that a caller, such as a craftsperson working on the line with a butt-in test set, or a telephone equipment installer, for example, may not know the telephone number associated with the line from which the call to the central office facility is being placed.

This problem is eliminated by the test device of the '949 patent, which is operative to provide the caller's telephone number, in response to the caller calling a prescribed ringback access code, which accesses the ringback test device 10 at the telephone central office. Upon receipt of the ringback access code, the test device 10 signals a specialized trunk facility 18 within the telephone central office 16, known as a toll trunk or outgoing trunk circuit, causing it to transmit a message that identifies the caller's telephone number. This number is then stored at the ringback test device 10 and the caller is instructed to disconnect from the circuit (go on hook). Once the caller goes back on-hook, the test device 10 sends a signal to the central office 16 instructing it to dial the stored telephone number. If the caller's telephone rings, the ringback test is considered successful.

Now although the scheme described in the '949 patent provides for ringback testing, it suffers from the fact that toll trunks are costly and may not always be available for testing purposes. Unless a test device has been installed with the toll trunk equipment in the central office, ringback testing cannot be conducted. Moreover, because a toll trunk is involved, its operation may result in toll charges associated with use of someone else's (e.g., the phone company) tester. In addition, a substantial amount of AC and DC signaling is necessary in order to obtain the calling party information through this type of interface.

To obviate this shortcoming, the '698 application describes a processor-based ringback testing scheme, diagrammatically shown in FIG. 2, which takes advantage of out-of-band signaling system protocol Signal System 7 (SS7) employed in caller identification (caller ID) class of service information currently provided by the telephone network during the four second silent interval between the first and second rings of the called subscriber's telephone number. The caller ID information contains the caller's telephone number, time of call, caller's name, and other information in a signal that is transmitted from the central office to a called subscriber during the four second silent interval between the first and second rings of the called subscriber's telephone. (For detailed information on caller ID signalling, attention may be directed to Bellcore Technical Reference TR-TSY-000031, Issue 3, January 1990 (Bellcore, Morristown, N.J.).

More particularly, in the improved ringback testing scheme of the '698 application, shown in FIG. 2, a caller's telephone 12 or 14 is connected to the telephone central office 16 through a telephone network, and to a test device 22. Unlike the test device 10 in the toll trunk-dependent system of FIG. 1, the test device 22 may be installed in an equipment bay at a telephone central station, or it may be portable and connected to the telephone network using a standard telephone connection. The test device 22 is assigned a telephone number so that, in effect, it becomes a subscriber in the telephone network.

Operation of the test device 22 is initiated by a call being placed from the caller's telephone 12 or 14 to the telephone number assigned to the test device. When the call has been switched to it, the test device detects and stores the caller ID information and, after the second ring, goes off hook—completing the connection to the caller's telephone. The test device then 'plays back' the detected and stored caller ID number to the caller, using a voice synthesizer to audibly "speak" the identified telephone number to the caller. The caller is instructed to go back on-hook, so that the test device 22 may place perform a ringback test by dialing the stored caller ID telephone number.

In addition the telephone number, per se, and/or name identified in the caller ID information, the test device may store other information that the caller may selectively retrieve, such as numbers entered manually by the caller from the caller's telephone, thereby enabling the test device to call other telephone numbers at the discretion of the caller, or used for further tests. The test device is further operative to provide a modem-sourced data session with caller equipment that employs a visual user interface, such as a video screen, printer, or data terminal, for viewing display-formatted caller ID and other information. This capability is particularly useful when a large number of ringback tests are being conducted and a record of such tests is desired. Also it enables a craftsperson to perform tests on the called circuit other than ringback, such as checking the caller ID by verifying that the detected caller ID information identifies the correct telephone number (in the event the caller's telephone number is known), or to validate a craftsperson's dispatch trouble ticket information relative to the subscriber's telephone number. The test device of the '949 application can also be used to verify that caller ID is properly coded for unlisted telephone numbers.

Now although the ringback test device described in the '698 application detects and stores caller ID information for subsequent use, including ringback testing, as described above, it does not address the testing of recent caller identification-related additions to the CLASS feature set— most notably 'Caller Identification with Call Waiting' (CIDCW). CIDCW is defined in Bellcore document TA-NWT-000575 and may be summarized as follows.

If a subscriber who is engaged in an active telephone call has the CIDCW feature enabled and receives an additional incoming call, the subscriber will receive a subscriber-alerting-signal identical to the standard call-waiting tone. Following this initial alerting signal, the subscriber's phone set or other customer premises equipment (CPE) will receive a CPE Alerting Signal (CAS) from the central office switching equipment using the above-referenced Signaling System 7 (SS7) network. This CAS signal prepares the CPE device, such as a Caller ID desk top display unit or display telephone, to receive the Caller ID data associated with the second caller. If the CPE is working and ready to receive the Caller ID information, it will respond to the central office switching equipment with an acknowledgement signal, after which the switching equipment will transmit the Caller ID information in accordance with the industry standard format described in Bellcore document TA-NWT-000030.

Attendant to the introduction of CIDCW, is the desire by telephone service providers to test this service in a manner that can also take advantage of out-of-band signaling system protocol Signal System 7 (SS7) employed in the caller identification (caller ID) class of service information, as does the test device described in the above-referenced '698 application.

SUMMARY OF THE INVENTION

The present invention addresses this need by providing a multiple port ringback test unit through which a telephone craftsperson can independently and through his own actions receive two concurrent complete telephone calls through the public switched telephone network (PSTN) upon demand. The invention allows this functionality to be provided even when the craftsperson does not know the telephone number from which he is calling.

As will be described, the multiple port ringback test unit of the present invention includes a first communication port (associated with voice channel signalling) and a second communication port (associated with either voice or data channel signalling). Each port has its own assigned telephone number and is coupled to a call supervision computer-controlled transceiver. Such multi-port signalling capability, which is used in the course of testing the ability of the telephone circuit to exercise caller identification and call waiting class (CIDCW) of service, as will be described, enables the present invention to place multiple return telephone calls to a subscriber number identified through the Caller ID data.

The test unit's transceiver includes a respective ring detector for each of the two telephone numbers, and respective line interface circuits and associated hybrids that are coupled to a processor-controlled modem. In addition, each communication port is selectively terminated by way of the same AC termination impedance, which is controllably inserted into the incoming line to terminate the caller ID signalling channel. All dual tone multifrequency (DTMF) command control is maintained exclusively through the first communication port. Command control is not accessible from the second communication port. Therefore, when a disconnect at the first communication port occurs—either intentionally or accidentally—the invention discontinues all active callbacks, regardless of which line they are on and drives all phone lines to the inactive (on-hook) state. The call supervision computer is programmed to cause the communication transceiver to interface signals that are effective to test the operation of the calling party's telephone circuit by way of either or both of the first and second communication ports.

In accordance with a first aspect of the multi-port test unit of the present invention is operative to test the ability of a telephone circuit installed in a telephone network to properly exercise caller identification and call waiting class (CIDCW) of service. For this purpose, in response to receiving and answering an incoming call directed to a first of its communication ports, the test unit is operative to detect and store the telephone number assigned to the calling telephone circuit, which number is contained in caller identification information provided by the telephone network. In particular, the inventive test unit captures and stores Caller Number and/or Name and Time of Delivery data upon access. It then issues a series of synthesized voice prompts associated with menu options available to the calling party.

In response to caller reply action to these synthesized voice prompts, such as the calling party using a phone keypad to enter prescribed menu-based response tones representative of conducting a test of the CIDCW feature of the calling telephone circuit, and initiates prescribed action by the test unit, the test unit prompts the calling party to hang-up (go back on-hook), and then places a first outgoing call by way of the first communication port to the telephone number that has been detected (and stored) as being assigned to the telephone circuit that placed the call to the test device, whether that call was placed from a craftsperson's test set or CPE.

To this end, once the calling party hangs up, the test unit drives the telephone line connected to its first communication port off-hook, and monitors the line for dial tone, whereupon it proceeds to dial (via DTMF signalling) the number associated with the Caller ID data. When the called telephone circuit is called, caller ID information is provided to the calling party, for example by way of a voice announcement of the calling number associated with the telephone number assigned to the first communication port of the test unit, and/or a display of that number by way of an attendant display unit, either integrated in the telephone set coupled to the subscriber's line circuit or by way of a separate display unit.

When the telephone unit coupled to the subscriber's line circuit (e.g., craftsperson test set or subscriber unit) answers this first callback or ringback, placed from the test unit, testing of the CIDCW class of service of the called telephone circuit is invoked by the test unit by placing a second outgoing ringback or callback, using its second communication port to the number assigned to the subscriber's line circuit. As a result of the first callback having already been established and causing the subscriber's telephone circuit to be busy, the second callback serves the purpose of exercising the called telephone circuit's Caller ID function for the Call Waiting environment. As in the case of the first callback, if the CPE is display-equipped, the caller ID for call waiting feature will be detected and displayed for viewing by the craftsperson, so that operation of the circuit's response may be visually monitored.

In addition, call progress tone monitoring may be performed on both callback lines in order to determine the state of each callback. Once both callbacks are completed, the craftsperson has several call treatment options, including: 1-putting the first outgoing call from the test device to the subscriber circuit's number on hold, while answering the second call; 2-ignoring the second call as with standard call-waiting; and 3-connecting both calls together in a conference arrangement. In the latter instance, the multi-port test unit of the present invention is operative to assert an identification tone on the second callback line, once it has been determined that the call has been answered. This line-two identification tone is maintained until the second line is driven on hook, and allows the technician, and possibly customer, to make the distinction between calls placed via the first and second communication ports.

During the course of validating Caller Name and Number Delivery to a subscriber's telephone set, a telephone craftsperson is required to perform several tasks, which may be divided into two general functions or sets of functions. The first function involves testing the telephone network's ability to properly forward the subscriber's information, either phone number or phone number and directory name listing, to the party being called by the subscriber. In some cases the appropriate information is a message indicating that the calling subscriber's number is unlisted and hence marked "private" for Caller Identification purposes. Further, the telephone line may or may not be capable of carrying the frequency shift keyed data required for Caller ID data transfer in which case a "data error" message may be displayed, in lieu of Caller ID data.

As pointed out above, the first feature of the present invention uses its multi-port signalling capability in the course of testing the ability of the telephone circuit to place multiple return telephone calls to a subscriber number identified through the Caller ID data, and thereby exercise caller identification and call waiting class (CIDCW) of service.

In accordance with a further feature, the service technician accessing the test unit of the invention may override the subscriber number identified by the Caller ID data and enter a different number from a standard DTMF (touch-tone) telephone or test set. Utilizing the alternative method offers the user the flexibility of a testing line other than the one used to access the test unit. This is of particular importance in situations where more than one telephone number is associated with a residence or business.

For instance, a home equipped with the distinctive ringing class of service offered by its local telephone service provider, in which telephone calls to a primary number invoke a standard ringing cadence, while calls to the same residence, but to a different phone number, such as those intended for a "business" or "teen" line cause the same phones to ring but using a different audible ringing cadence, in order for the customer to determine for whom the incoming call is intended simply by the listening to the cadence of the ringing signal. For business applications, this feature of the invention may be utilized for making a particular line or trunk in a "rotary/hunt" group ring.

In this environment a call placed from a business phone may be routed through one of several different outgoing trunks, each with a differently assigned telephone number. With its caller ID detection and storage feature, the test unit of the present invention is operative to determine the phone number of the single trunk that was chosen to make the access call. The choice of any one of the specific outgoing trunks available in a business is generally not made by the caller, but rather the telephone switching system or PBX system. Therefore, in order to effect a callback on a specific numbered trunk, the technician must be allowed to override the Caller ID data and manually enter the number to which the return telephone call is to be placed. It is to this requirement that the Caller ID override feature of this invention is addressed.

In addition to conducting the foregoing operations, the craftsperson may employ the second port to conduct a modem-based data session with a complementary data unit coupled to the subscriber's line circuit. As mentioned above, whenever an call is directed to the test unit, whatever tone-encoded, caller associated information is contained in the incoming ringing signal is received and stored by the test unit. Since the contents of this encoded information may involve considerably more than simply the calling party's number, such as the name and/or address of the caller, time of day, etc., playback of such information is not practically realized using a voice synthesizer. However, such information is readily downloaded to a data device coupled to the subscriber's line circuit, by establishing a data link with the test unit. The second communication port and the modem provided in the test unit serve to provide this functionality.

Pursuant to a further "Call Return" feature, the test unit of the invention is operative to cause a call to be returned to a calling telephone circuit and thereby test that circuit's ability to receive incoming calls, even through the caller ID detection and storage functionality of the invention cannot be exercised on the incoming call, for example, in the case where access to such caller ID information normally provided by the telephone network has been restricted or 'masked'. This feature of the invention takes advantage of the fact that whenever any network subscriber places a call to another (called) subscriber, the central office switching equipment keeps a temporary record of the called number.

More particularly, if for any reason a called subscriber does not, or cannot answer the call when it comes in, he may use what is known as a Call Return class of service of the central office switching equipment to place a return call to the original caller, even though the identity of the calling party is unknown. In order to invoke the call return class of service, the called party goes off-hook and dials the Call Return code (usually *69) prior to placing another phone call. The telephone network's switching equipment will then place a return call to the original calling telephone circuit just as if it were dialed normally.

The Call Return feature of the test unit of the present invention basically emulates this routine by hanging up and then dialing the Call Return code at the craftsperson's request to do so in reply to a voice menu prompt. Then, at the telephone number to which the craftsperson's equipment is coupled, incoming or 'return' call to the telephone circuit is monitored for the presence of caller ID information identifying the telephone number of the test circuit test device. Although the default dialing code to invoke Call Return is *69, this code is programmable and can be changed to support various local telephone company standards. A user mode menu item is employed to invoke this feature and the voice prompt indicates the appropriate dial code function to invoke "CALL RETURN".

In accordance with an additional 'Message Waiting Indicator' test feature of the invention, the test unit is controllably operative to readily validate the status and state of service for a Message Waiting indicator, such as lamp or message on a display screen provided on some caller ID equipment (or an audible signal for the visually impaired) that is normally turned on if a voice message is waiting for the phone number to which the equipment is connected, and then turned off when the user of the feature accesses indicated messages.

The conventional method of determining whether such a message waiting service is operating properly requires that a message be left, followed by a waiting period of time, during which the central office switching equipment will send a data message to the CPE equipment indicating that a message is present. Upon receipt of this message from the central office equipment, the CPE equipment will energize the message waiting indicator. In the absence of a waiting message, the CPE equipment is expected to turn off the message waiting indicator in order to accurately inform the user that no messages are pending. Both of these operations are slow and inefficient.

To remedy this problem, the 'Message Waiting Indicator' test feature of the invention provides a user with a voice-prompted menu, from which specific functions are selectable, so as to allow the test unit to send, upon user demand, either a "message Waiting Activate" or a "Message Waiting De-Activate" signal to the CPE equipment. Using this feature, the craftsperson, (or even the subscriber) may invoke a test, which immediately tests the ability of not only the CPE equipment to properly display Message Waiting Status properly, but also the central office switching system's ability to send the appropriate data concerning Message Waiting. This real time information allows a repair technician to determine the cause of erroneous signaling directly from the field or customer's location without requiring the services of additional network personnel.

DETAILED DESCRIPTION

Figure 1:
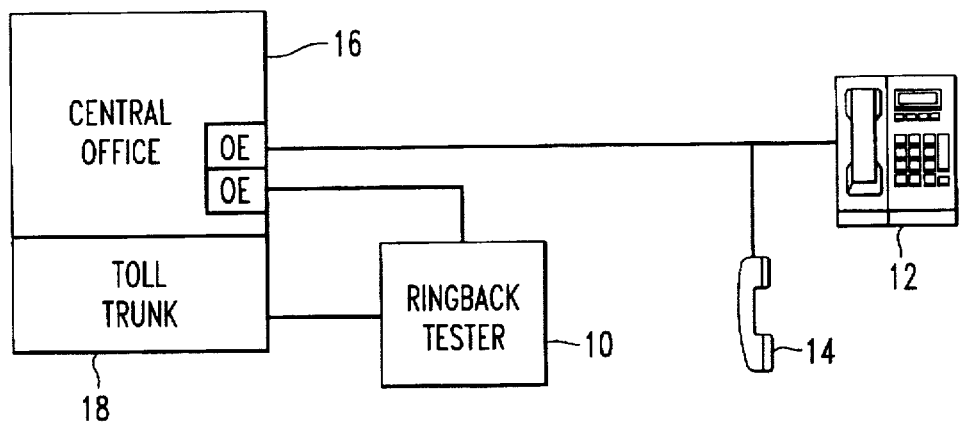
FIG. 1 is a diagrammatic illustration of a simplified telephone network having a ringback test circuit provided at the central office.
Figure 2:
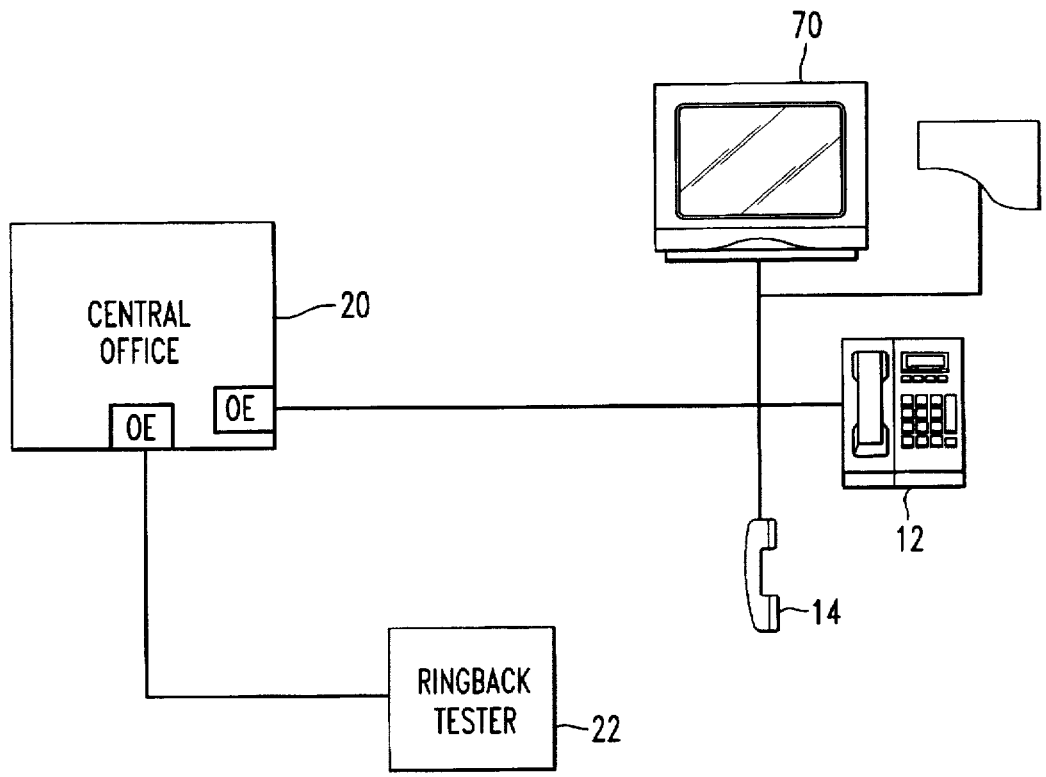
FIG. 2 is a diagrammatic illustration of an embodiment of a single-port ringback testing device described in the above-referenced '698 application.

Before describing in detail the new and improved multi-port ringback test unit of the present invention, it should be observed that the invention resides primarily in what is effectively a prescribed arrangement of conventional communication circuits and associated signal processing components. Consequently, the configuration of such circuits components and the manner in which they are interfaced with other communication network equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the system in a convenient functional grouping, whereby the present invention may be more readily understood.

Figure 3:
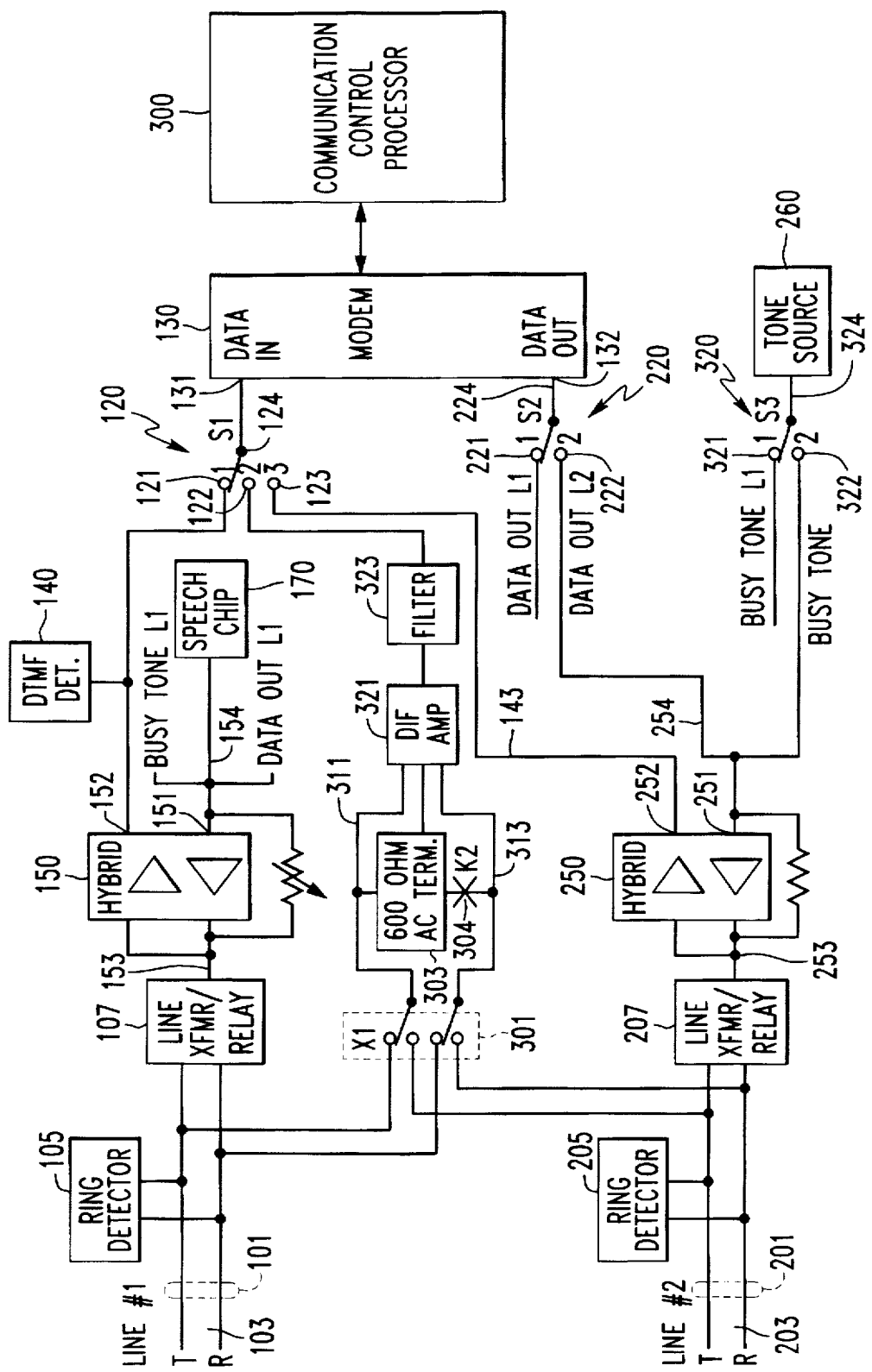
FIG. 3 is a diagrammatic illustration of an embodiment of a multi-ported testing unit in accordance with the present invention.
Figure 4:
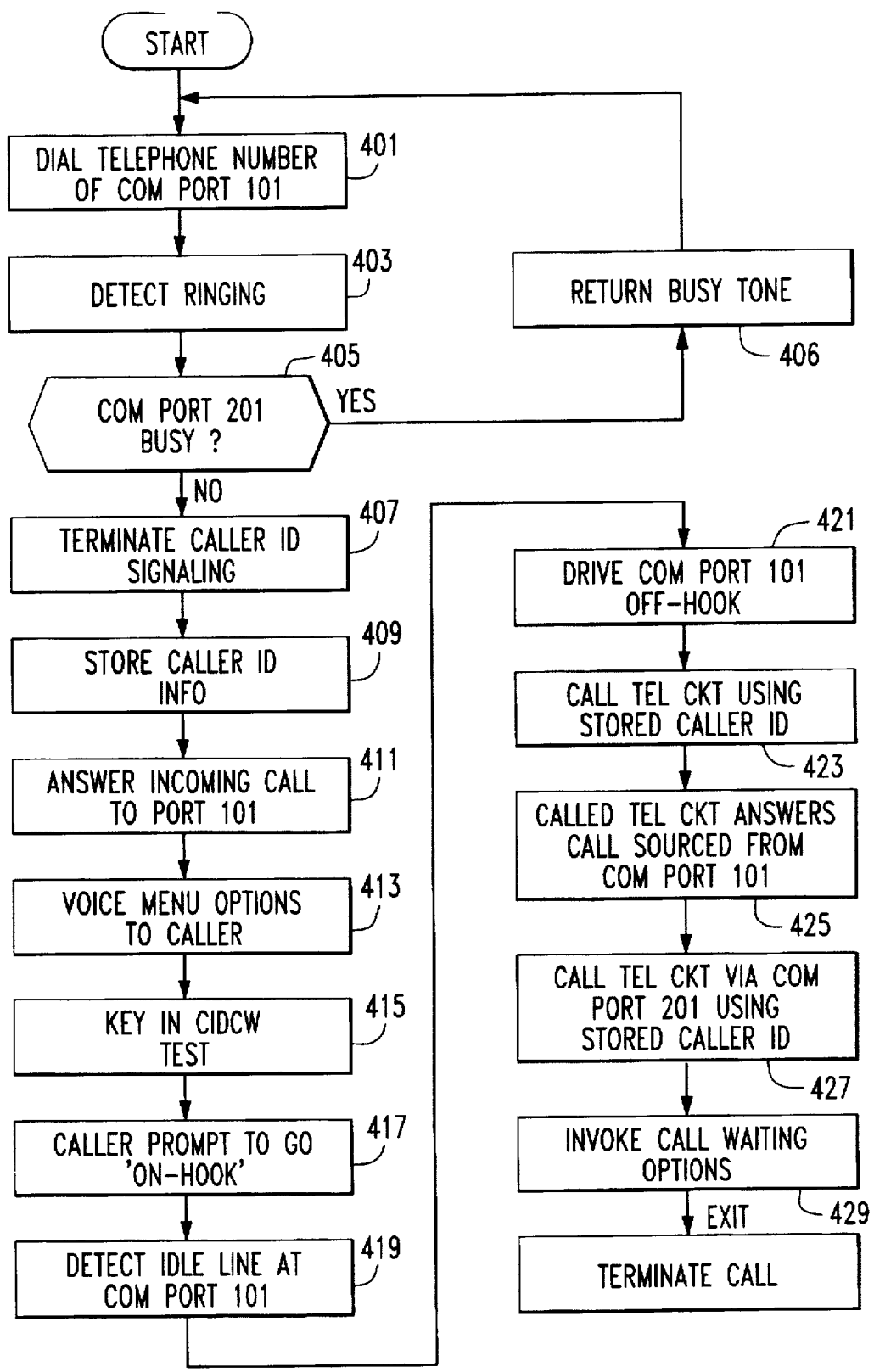
FIG. 4 is a flow chart of respective steps of a CALLER ID, CALL-WAITING TEST using voice and data communication ports of the multi-ported test unit of FIG. 3.

Referring now to FIG. 3, an embodiment of a multi-port testing unit in accordance with the present invention is diagrammatically illustrated as comprising a first (voice channel) communication port 101 coupled to tip and ring conductors of a first line circuit 103, and a second (data channel) communication port 201 coupled to tip and ring conductors of a second line circuit 203. These respective communication ports 101 and 201 are coupled to transceiver circuitry which includes ring detectors 105 and 205 for each of two telephone numbers assigned to the test unit, and respective line relay interface circuits 107 and 207. Ring detectors 105 and 205 are ported to a communication control processor 300. To avoid cluttering the drawings, connection links between the control processor 300 and respective components with which it is interfaced have, for the most part, not been shown in FIG. 3.

As described briefly above, and as will be detailed below with reference to the flow charts of FIGS. 4–7, the communication control processor 300 is programmed to cause the test unit of FIG. 3 to interface signals that are effective to test the operation of a calling party's telephone circuit by way of either or both of the first and second communication ports 101 and 201.

The transceiver circuitry of the test unit of FIG. 3, to which of communication ports 101 and 201 are coupled, further includes switch contacts of a processor-controlled relay 301 to a (600 ohm) off-hook AC termination impedance 303, which is controllably inserted by the test unit's control processor across tip and ring during reception of caller ID FSK signalling information between the first and second rings of an incoming call. AC termination impedance 303 is selectively bridged across tip and ring lines 311 and 313, to which one of the tip and ring pairs of the respective line circuits 103 and 203 is controllably connected, by way of the switch contacts of relay 301.

Lines 311 and 313 are coupled to a differential amplifier 321, the output of which is coupled through bandpass filter 323 to a switch terminal 122 of a processor-controlled switch 120 (S1). Filter 323 is tuned to pass the FSK caller ID information contained in an incoming call. Switch 120 has its common terminal 124 coupled to a data input port 131 of a modem unit 130, having a digital data port 133 ported to communication control processor 300. Processor-controlled switch 120 has a switch terminal 121 coupled via link 141 to an output 152 of a dual hybrid unit 150, and a switch terminal 123 coupled via link 143 to an output 252 of a dual hybrid unit 250. Hybrid unit 150 has a bidirectional port 153 coupled to processor-controlled line relay interface circuit 107. Hybrid 150 has an input 151 coupled via line 154 to a speech synthesizer 171, which is controlled by processor 300 to generate voice menu instructions to a calling port accessing the test unit.

Link 141 is further coupled to a DTMF detector 140, which is ported to control processor 300, and is employed to maintain all dual tone multifrequency (DTMF) command control exclusively through the first communication port 101. No command control is accessible from the second communication port, so that when a disconnect at the first communication port 101 occurs, all active callbacks are discontinued, regardless of the communication port to which they are coupled, an all phone lines are driven to the inactive (on-hook) state.

Line 154 is further coupled to a first switch terminal 221 of a processor-controlled switch 220 (S2), and to a first switch terminal 321 of a further processor-controlled switch 320 (S3). Switch 320 has a second switch terminal 322 coupled over line 254 to input 251 of dual hybrid unit 250. Switch 220 has its common terminal 224 coupled to the data output terminal 132 of modem unit 130. Line 254 is further coupled to a second switch terminal 222 of switch 220. Dual hybrid unit 250 has a bidirectional port 253 coupled to line relay interface circuit 207. Switch 320 has its common terminal 324 coupled to a tone source 260. As will be described, tone source 260 controllably sources busy tone to a calling party via one of the communication ports if the test unit is already engaged with a call on the other communication port.

OPERATION

The operation of the test unit of FIG. 3 will now be described with reference to the flow charts of FIGS. 4–7, which show the respective steps of communication exchange sequences between a calling party, such as a craftsperson's test set, used to access the test unit of the invention.

CALLER ID, CALL-WAITING TEST (FIG. 4)

As pointed out above, in order to test the caller identification and call waiting class (CIDCW) of service of a (subscriber's) telephone circuit, a call is placed from a telephone unit, such as a craftsperson's test set or CPE, that is coupled to the telephone circuit, usually at the customer premises. For this purpose, the craftsperson dials into the test unit of FIG. 3, as by dialing the telephone number associated with its communication port 101, as shown at step 401 in the flow chart of FIG. 4. When the incoming ringing tone is detected (step 403), ring detector 105 provides an output to the control processor 300 advising the test unit of the presence of an incoming call.

In query step 405, a determination is made as to whether the test unit is already engaged with a call on the other communication port (port 201 in the present example). If the answer to query step 405 is YES, processor 300 causes a busy tone to be returned in step 406 from tone source 260 via switch contact 321 of switch 320 to the input 151 of hybrid unit 150. The busy tone is coupled thereby through line relay interface unit 107 to port 101. However, in the present example, it will be assumed that the answer to query step 405 is NO (the test unit is not currently involved in another call via communication port 201), so that the test unit may proceed to answer the call.

Next, in step 407, communication control processor 300 operates relay circuitry within the line transformer/relay unit 107, so as to maintain the switch contacts of relay 301 defaulted to termination impedance 303, via relay contacts 304, which are also closed, so that the FSK-encoded signal is properly terminated by the 600 ohm AC termination impedance 303. Control processor 300 also operates switch 120, so as to couple terminal 123 to the data input 131 of modem 130. As a result, whatever caller ID information (e.g., Caller Number and/or Name and Time of Delivery data) is contained between the first and second rings tones of the incoming call is output from differential amplifier 321 through filter 323 to the data input 131 of modem 130, from which it is coupled to and stored in processor memory, as shown at step 409.

When the incoming call to the first communication port 101 is answered (step 411), control processor 300 uses speech synthesizer 170 to issue a series of synthesized voice prompts associated with menu options available to the calling party, as shown in step 413. Such voice prompts may include a request that the calling party enter a 'password' (by way of keypad-sourced DTMF signals), to start the test. The user then proceeds to enter further caller reply-sourced DTMF tones associated with a CIDCW test and selected in accordance with the voice menu provided to the caller) in step 415. As DTMF tones are received decoder 140 provides output signals to the processor 300. Next, in step 417, control processor 300 prompts the calling party to hang-up (go back on-hook).

When the test processor detects that the calling party has gone back on-hook in step 419, then in step 421, the test unit drives the telephone line 103 connected to its first communication port 101 off-hook, and monitors the line for dial tone, whereupon it proceeds to dial (via DTMF signalling via modem 130) the number associated with the Caller ID data it has stored from the previous incoming call, as shown at step 423.

In particular, control processor 130 places a first outgoing call by way of the data output terminal 132 of modem 130 through the switch terminal 121 of switch 120, to the input 151 of hybrid unit 150. Hybrid unit 150 outputs the first callback or ringback through the line transformer/relay unit 107 to the first communication port 101, for transmission to the telephone number previously detected (and stored) as being assigned to the telephone circuit that placed the call to the test unit. This first ringback call will contain the caller ID information associated with the telephone number assigned to the first port 101 of the test unit, so that the calling party will be advised, via whatever caller ID output device is coupled to the subscriber's line circuit, that the number it previously called to invoke the CIDCW test has called back.

As pointed out previously, this caller ID information may be provided to the calling party by way of a voice announcement of the calling number associated with the telephone number assigned to the first communication port of the testing unit, and/or a display of that number by way of an attendant display unit, either integrated in the telephone set coupled to the subscriber's line circuit or by way of a separate display unit. When the telephone unit coupled to the subscriber's line circuit (e.g., craftsperson test set or subscriber unit) goes off-hook in answering this first callback or ringback from the test unit, as shown by step 425, testing of the CIDCW class of service of the called telephone circuit is invoked.

For this purpose, as shown by step 427, a second outgoing ringback or callback of the telephone circuit of interest is placed by processor 300, using the test unit's second communication port 201. In placing this second callback to the subscriber's circuit, the control processor 130 operates switch 120 to connect the data output terminal 132 of modem 130 through switch terminal 222 of switch 120, and thereby to the input 251 of hybrid unit 250. Hybrid unit 250 outputs the second ringback call through the line transformer/relay unit 207 to the second communication port 201, for transmission to the same telephone number previously detected (and stored) as being assigned to the telephone circuit that placed the call to the test unit, and called back by the first ringback call. Like the first ringback call, the second ringback will contain caller ID information associated with the test unit. Since a separate telephone number is assigned to port 201, the caller ID information in the ringback call from port 201 will contain the telephone number assigned to the second port 201 of the test unit, so that the calling party will be advised via its caller ID output device of this second number.

Since the first ringback call has already been answered by the subscriber's line circuit, that line circuit is currently busy, so that the second callback serves the purpose of exercising the called circuit's Caller ID function for the Call Waiting environment. As in the case of the first callback, assuming that the CPE is display-equipped, the caller ID for call waiting feature for the second line will be detected and displayed for viewing by the craftsperson, so that operation of the subscriber's circuit's response may be visually monitored by the craftsperson.

Once both callbacks are completed as described above, the craftsperson has several call treatment options, as shown at step 429, including: 1-putting the first ringback call from the test device to the subscriber circuit's number on hold, while answering the second ringback call; 2-ignoring the second ringback call as with standard call-waiting; 3-connecting both ringback calls together in a conference arrangement; and 4-terminating the call. In order to properly use the third option, the test unit is operative to assert a 'callback progress' identification tone on the second callback line, once it has been determined that the call has been answered. This line-two identification tone is maintained until the second ringback line is driven on-hook, and allows the technician, or customer, to make the distinction between calls placed via the first and second communication ports 101 and 201.

In the CIDCW test routine described above, the caller ID information in the incoming call accessing the test unit is that associated with the telephone circuit from which the call is placed. In accordance with a further feature, the service technician accessing the test unit of the invention may override the subscriber number identified by the Caller ID data, and enter a different number from a standard DTMF (touch-tone) telephone or test set. Utilizing this alternative method makes it possible to test a line other than the one used to access the test unit. This is of particular importance in situations where more than one telephone number is associated with a residence or business.

As a non-limiting example, a residence may be equipped with the distinctive ringing class of service offered by its local telephone service provider, in which telephone calls to a primary number invoke a standard ringing cadence, while calls to the same residence, but to a different phone number, such as those intended for a "business" or "teen" line cause the same phones to ring, but with a different audible ringing cadence. These separate or 'distinctive' rings enable the customer to determine for whom the incoming call is intended.

For business applications, this feature of the invention may be utilized for making a particular line or trunk in a "rotary/hunt" group ring. Thus, a call placed from a business phone may be routed through one of several different outgoing trunks, each with a differently assigned telephone number. Since the test unit detects and stores whatever caller ID information is contained in the incoming call, regardless of its source, it can determine the phone number of the single trunk that was chosen to make the access call. The choice of any one of the specific outgoing trunks available in a business is generally not made by the caller, but rather the telephone switching system or PBX system.

To effect a callback on a specific numbered trunk, the craftsperson invokes an override of the Caller ID data via his test set, and then manually enters the number to which the return telephone call is to be placed. The sequence of operations then proceeds as described above, with the ringback calls being placed to the override number supplied by the craftsperson.

MODEM DATA SESSION (FIG. 5)

In addition to conducting the foregoing operations, the craftsperson may employ the second communication port 201 of the test unit to conduct a modem-based data session with a complementary data unit (e.g., data terminal unit (DTE) or test set) coupled to the subscriber's line circuit from which the call to the test unit is placed. As mentioned above, whenever an call is directed to the test unit, the tone-encoded caller ID information contained in the incoming ringing signal is received and stored by the test unit. Since the contents of this encoded information may involve considerably more than simply the calling party's number, such as the name and/or address of the caller, time of day, etc., playback of such information is not practically realized using a voice synthesizer. However, such information is readily downloaded to a data device coupled to the subscriber's line circuit, by establishing a data link with the test unit. The data channel communication port 201 and the modem 130 provide this functionality.

Figure 5:
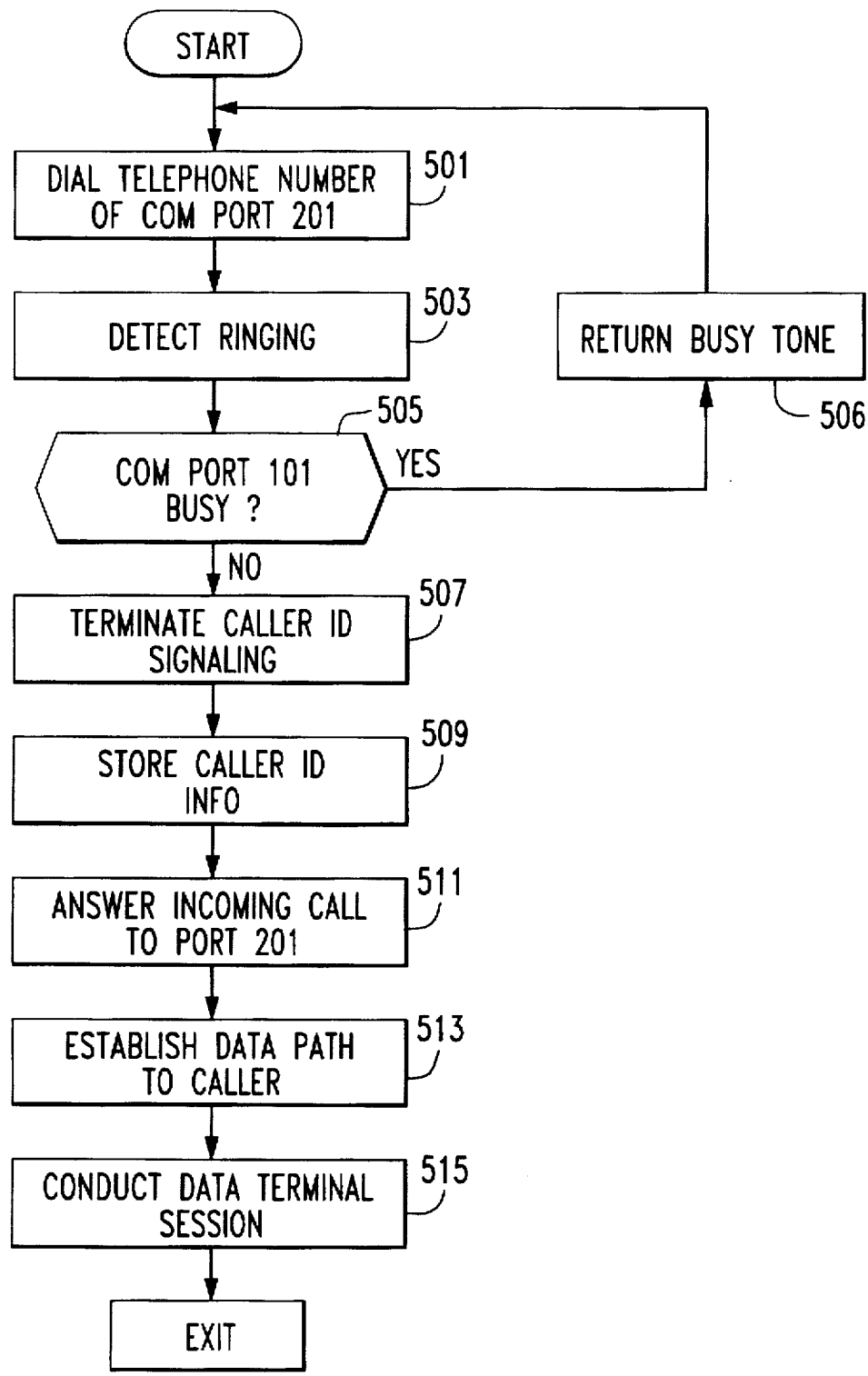
FIG. 5 is a flow chart of respective steps for a MODEM DATA SESSION using a data communication port of the multi-ported test unit of FIG. 3.

In order to establish a data session with the test unit, the craftsperson dials into the test unit, by dialing the telephone number associated with the second communication port 201, as shown at step 501 in the flow chart of FIG. 5. When the incoming ringing tone is detected (step 503), ring detector 205 provides an output to the control processor 300 advising the test unit of the presence of the incoming call. In query step 505, a determination is made as to whether the test unit is already engaged with a call on the other communication port (port 101). If the answer to query step 505 is YES, processor 300 causes a busy tone to be returned in step 506 from tone source 260 via switch contact 322 of switch 320 to the input 251 of hybrid unit 250. The busy tone is coupled thereby through line relay interface unit 207 to communication port 101. In the present example, it will be assumed that the answer to query step 505 is NO (the test unit is not currently involved in another call via communication port 101), so that the test unit may proceed to answer the incoming call on port 201.

Next, in step 507, communication control processor 300 operates relay circuitry within the line transformer/relay unit 207, so as to the switch the contacts of relay 301 to line 203, so that the incoming call on port 201 will be coupled to termination impedance 303, via relay contacts 304, which are also closed, whereby that the FSK-encoded signal is properly terminated by the 600 ohm AC termination impedance 303. Control processor 300 also operates switch 120, so as to couple terminal 123 to the data input 131 of modem 130. Thus, the caller ID information (e.g., Caller Number and/or Name and Time of Delivery data) contained between the first and second ring tones of the incoming call to communication port 201 is output from differential amplifier 321 through filter 323 to the data input 131 of modem 130, from which it is coupled to and stored in processor memory, as shown at step 509.

When the incoming call to the second communication port 201 is answered (step 511), control processor 300 operates switches 120 and 220, to connect the respective data input and output ports 131 and 132 of modem 130 to the output and input ports 252 and 251 of hybrid 250, thereby establishing a bidirectional data path between port 201 and the modem, as shown at step 513, so that a data exchange session between the calling party terminal device and the test unit may take place, as shown at step 515.

The data session with the craftsperson is then interactive, with instructions displayed on the caller's data terminal or test device initially prompting the user to enter a 'password' and, if accepted, to select from specified menu choices or supply information for verify all of the caller ID information, such as the spelling of a subscriber's name. This interactive data session feature of the invention obviates the practical inability of a voice synthesizer to play back the substantial amount of caller ID information contained that is detected and captured by the test unit, which may include considerably more than simply the calling party's number, such as the name and/or address of the caller, time of day, etc.

CALL RETURN TEST (FIG. 6)

As pointed out above, the placing of a call to the test unit of the present invention to validate Caller Name and Number Delivery to a subscriber's telephone set also effectively tests the network's ability to properly forward the subscriber's information (e.g. phone number or phone number and directory name listing) to a party being called (the test set) by the subscriber. In some cases, however, the caller ID information may be restricted, so that the information contained in the incoming call to the test unit is a message indicating that the calling subscriber's number is unlisted and hence marked "private" for Caller Identification purposes. As a result the desired caller identification information is not detected and stored. Another possibility is that the telephone line is not capable of carrying the frequency shift keyed data required for Caller ID data transfer, in which case a "data error" message may be displayed, in lieu of Caller ID data. In either case, since the test unit cannot determine caller ID information from the incoming call, it cannot use such (missing) information to test the ability of the calling telephone circuit to receive calls.

Pursuant to a further "Call Return" feature, the inventive test unit employs an alternative mechanism for placing a 'ringback' call to the calling telephone circuit and thereby test that circuit's ability to receive incoming calls, even through the caller ID detection and storage functionality of the invention cannot be exercised on the incoming call, for example, in the case where access to such caller ID information normally provided by the telephone network has been restricted or 'masked', as described above. This feature of the invention takes advantage of the fact that whenever any network subscriber places a call to another (called) subscriber, the central office switching equipment keeps a temporary record of the called number.

As described previously, in accordance with the Call Return class of service offered by the telephone network, if a called subscriber does not, or cannot, answer an incoming call, he may still successfully return the call by dialing a specified Call Return code (usually *69) prior to placing another phone call. The telephone network's switching equipment will then place a return call to the original calling telephone circuit (whose number has been temporarily stored), just as if it were dialed normally. The Call Return feature contained in the test unit of the present invention basically emulates the routine carried out by the subscriber.

Figure 6:
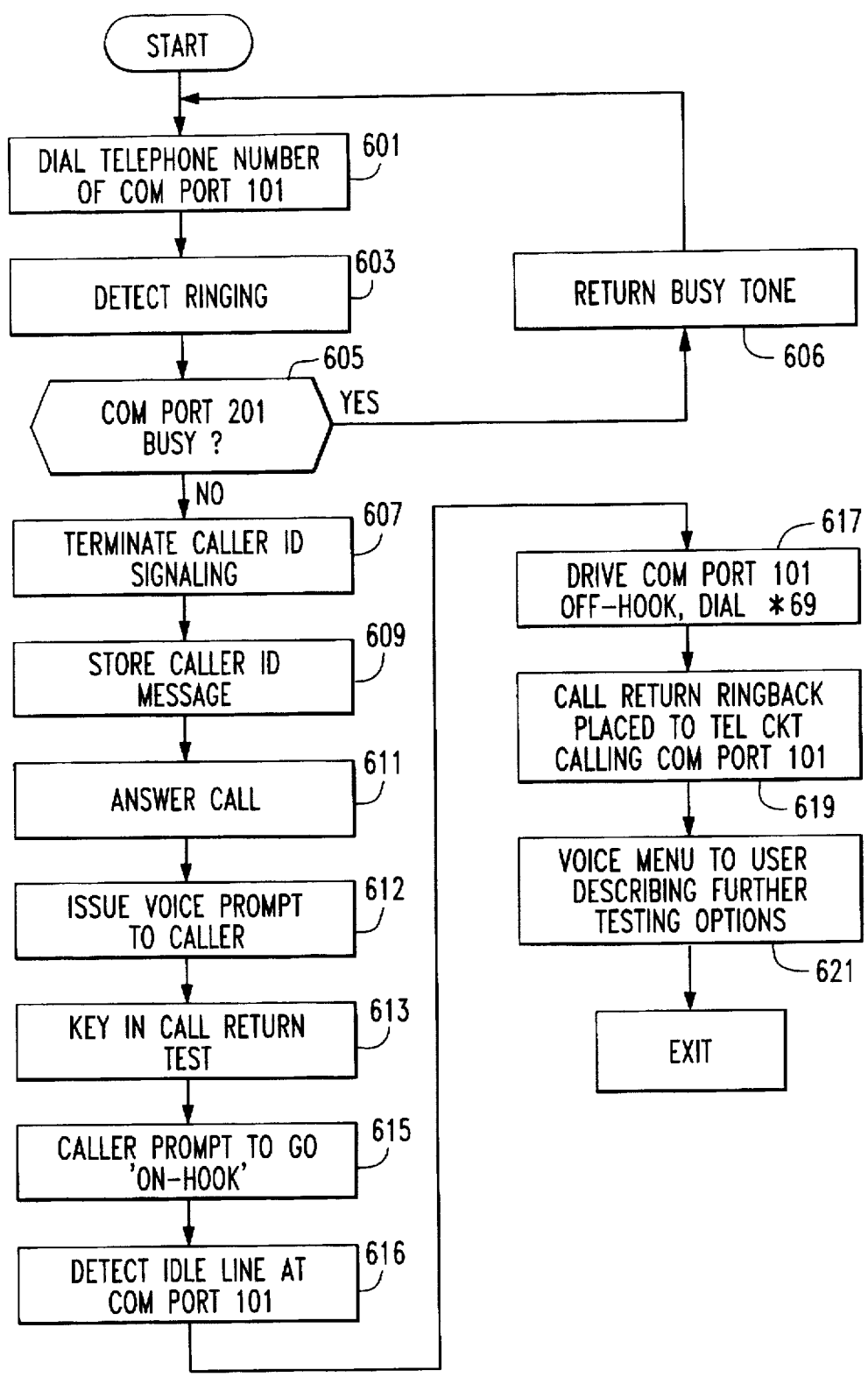
FIG. 6 is a flow chart of respective steps for invoking a CALL RETURN from the test unit of FIG. 3.

More particularly, as in the testing of the caller identification with call waiting class (CIDCW) of service of a (subscriber's) telephone circuit, described above, and detailed in the flow chart of FIG. 4, the craftsperson dials into the test unit as by dialing the telephone number associated with its communication port 101, as shown at step 601 in the flow chart of FIG. 6. When the incoming ringing tone is detected (step 603), ring detector 105 provides an output to the control processor 300 advising the test unit of the presence of an incoming call.

Again, in query step 605, a determination is made as to whether the test unit is already engaged with a call on the other communication port (port 201). If the answer is YES, a busy tone is returned to port 101 in step 606. Assuming that the answer to query step 605 is NO, the test unit proceeds to answer the call.

In step 607, processor 300 operates relay circuitry within the line transformer/relay unit 107, so as to terminate the line to the AC termination impedance 303. It also operates switch 120, so as to couple terminal 123 to the data input 131 of modem 130, so that the caller ID information contained in the incoming call is coupled to the data input 131 of modem 130, from which it is coupled to and stored in processor memory, as shown at step 609.

Since, in the present example, the caller ID information does not reveal the calling party's telephone number, when the incoming call to the port 101 is answered (step 611) a voice prompt of this fact is issued (via speech synthesizer 170) to the caller in step 612, who then logs on by entering a 'password' (by way of keypad-sourced DTMF signals). The user may then enter further caller reply-sourced DTMF tones associated with the call return mode and selected from the voice menu provided to the caller) in step 613. Next, in step 615, the processor prompts the calling party to go back on-hook.

When the test processor detects that the calling party has gone back on-hook in step 616, then in step 617, it invokes the call return feature (e.g., by dialing *69) via the called communication port (101 in the present example). Although the default dialing code to invoke Call Return is typically *69, this code is programmable and can be changed to support various local telephone company standards. In response to the test unit invoking the call return feature, the network then places a 'call return' ringback call to the subscriber's telephone circuit, in step 619.

Since the caller ID information in the test unit is unrestricted, the call return ringback call will contain the caller ID information associated with the telephone number assigned to the first port 101 of the test unit, so that, in step 621, the calling party will be advised, via whatever caller ID output device is coupled to the subscriber's line circuit, that the call return operation has been successful. (As noted above, this caller ID information may be provided to the calling party by way of a voice announcement of the calling number associated with the telephone number assigned to the first communication port of the test unit, and/or a display of that number by way of an attendant display unit, either integrated in the telephone set coupled to the subscriber's line circuit or by way of a separate display unit.)

MESSAGE WAITING INDICATOR TEST (FIG. 7)

In accordance with the 'Message Waiting Indicator' test feature of the invention, the test unit is employed to controllably validate the operability of a Message Waiting indicator, such as lamp or message on a display screen provided on CPE caller ID equipment (or an audible signal for the visually impaired), that is normally turned on if a voice mail message is waiting for the phone number to which the equipment is connected, and then turned off when the user of the feature accesses indicated messages.

As described above, the conventional method of determining whether such a voice mail message waiting indicator is operating properly requires that a message be left, followed by a waiting period of time, during which the central office switching equipment will send a data message to the CPE equipment indicating that a message is present. Upon receipt of this message from the central office equipment, the CPE equipment will energize the message waiting indicator. In the absence of a waiting message, the CPE equipment is expected to turn off the message waiting indicator in order to accurately inform the user that no messages are pending.

Because these operations are slow and inefficient, the test unit of the invention incorporates a 'Message Waiting Indicator' test mechanism which is invoked by way of the voice-prompted menu presented to the caller at the beginning of a call, as described above, and thereby allow the test unit to send, upon user demand, either a "message Waiting Activate" or a "Message Waiting De-Activate" signal to the CPE equipment. Using this feature, the craftsperson, (or even the subscriber) may invoke a test, which immediately tests the ability of not only the CPE equipment to properly display Message Waiting Status properly, but also the central office switching system's ability to send the appropriate data concerning Message Waiting. This real time information allows a repair technician to determine the cause of erroneous signaling directly from the field or customer's location without requiring the services of additional network personnel.

Figure 7:
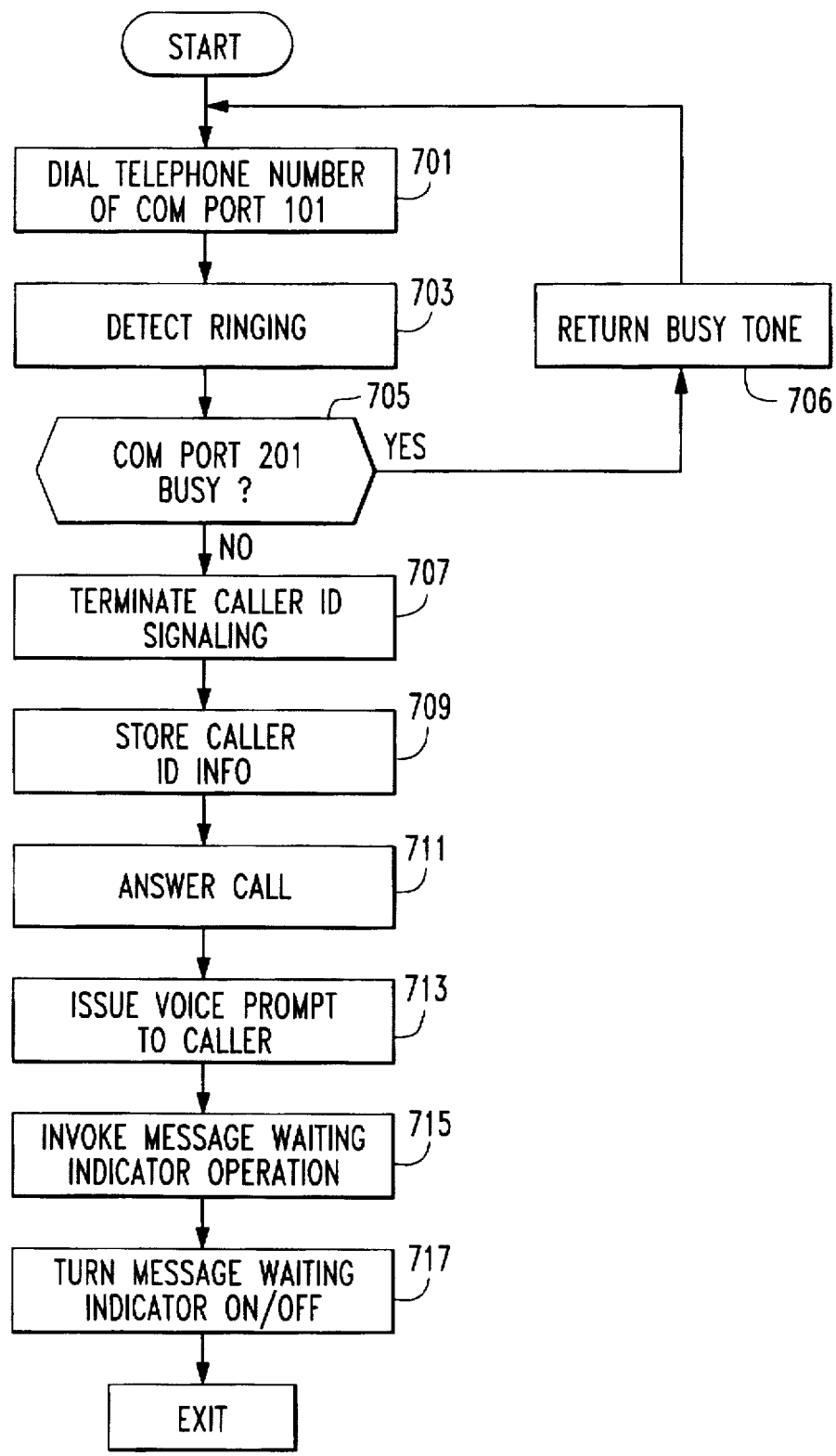
FIG. 7 is a flow chart of respective steps for a MESSAGE WAITING INDICATOR TEST using a voice communication port of the multi-ported test unit of FIG. 3.

As described previously, as in the testing of the caller identification with call waiting class (CIDCW) of service of a (subscriber's) telephone circuit, and the use of the call return feature, the craftsperson dials into the test unit, by dialing the telephone number associated with its communication port 101, as shown at step 701 in the flow chart of FIG. 7. When the incoming ringing tone is detected (step 703), ring detector 105 provides an output to the control processor 300 advising the test unit of the presence of an incoming call. Assuming that the answer to a busy query step 705 indicates that the test unit is not already engaged with a call on the other communication port (port 201), the test unit proceeds to answer the call. Otherwise a busy tone is returned in step 706.

In step 707, the test unit's communication processor operates relay circuitry within the line transformer/relay unit 107, so as to terminate the line to the AC termination impedance 303. It also operates switch 120, so as to couple terminal 123 to the data input 131 of modem 130, so that the caller ID information (e.g., Caller Number and/or Name and Time of Delivery data) contained in the incoming call is coupled to the data input 131 of modem 130, from which it is coupled to and stored in processor memory, as shown at step 709.

When the incoming call to the first communication port 101 is answered (step 711), control processor 300 uses speech synthesizer 170 to issue a series of synthesized voice prompts associated with menu options available to the calling party, as shown in step 713. Again these voice prompts may include a request that the calling party enter a 'password' (by way of keypad-sourced DTMF signals), to start the test. The user then proceeds to enter further caller reply-sourced DTMF tones associated with selection of the desired message waiting indicator test from the voice menu provided to the caller in step 715.

Depending upon the choice entered by the user ('message waiting indicator ON' or 'message waiting indicator OFF'), the control processor will operate switch 220 to couple the data output port 132 of modem 130 to line 154, so that a prescribed FSK-formatted 'message waiting indicator' control message sourced from the control processor and coupled to modem 130 for transmission will be asserted via the first communication port 101 to the calling subscriber's unit, as shown by step 717. The user may then monitor the response of the message waiting indicator of the subscriber's unit to determine whether the indicator is working properly.

As will be appreciated from the foregoing description, through the addition of a second communication channel and enhanced software, the caller ID-based test unit of the present invention is able to augment the testing functionality of the test device described in the above-referenced '698 application, by incorporating all the above described features into one device, that is accessible and remotely controllable by a single telecommunications technician. The test unit of the invention is not only capable of determining the telephone number, subscriber name and various other information associated with the subscriber line used to access to the unit, but is operative to conduct various tests of a telephone circuit from which a call to the test device is placed, which include exercising a call identification, call waiting class of service, testing the ability of the telephone circuit to receive incoming calls, and testing the operation of a message-waiting indicator of a telephone unit coupled to the telephone circuit.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. A method of testing a communication circuit installed in a communication network, said communication circuit having caller identification and call waiting classes of service, said method comprising the steps of:
  (a) calling, from a caller's communication unit coupled to said communication circuit, a telephone number assigned to a test device in said telephone network;
  (b) detecting at said test device a telephone number assigned to said communication circuit as contained in identification information provided by said communication network;
  (c) placing a first call to said telephone number assigned to said communication circuit by way of a first port of said test device;
  (d) in response to said caller's telephone answering said first call placed in step (c), stimulating said call waiting classes of service of said communication circuit by placing a second call to said telephone number assigned to said communication circuit by way of a second port of said test device.

2. A method according to claim 1, wherein said caller's communication unit comprises a craftsperson's test set.

3. A method according to claim 1, further comprising, the step of:
  (e) performing call progress tone monitoring of said communication circuit by way of each of said first and second ports of said test device.

4. A method according to claim 1, wherein step (d) further comprises, in response to said caller's communication unit answering said second call, supplying an identification tone to said communication circuit by way of said second port of said test device.

5. A method according to claim 1, wherein step (b) further comprises detecting at said test device further information associated with said communication circuit in addition to said telephone number assigned to said communication contained in identification information provided by said communication network, and further including the step of:

(e) transmitting said further information from said second port of said test device to customer premises equipment ported to said communication circuit.

6. A method of testing the ability of a communication circuit, having caller identification and call waiting classes of service, to receive incoming calls placed to it over a communication network to which said communication circuit is connected, comprising the steps of:

(a) placing a first call to a test device, installed in said communication network, by way of a communication device that has been coupled to said communication circuit;

(b) causing said communication circuit test device to invoke a call return operation through said communication network, so that a second call is placed from said communication test device to said communication circuit; and (c) monitoring said communication circuit, by way of said communication device, for receipt of said second call and caller information contained therein identifying said test device.

7. A method according to claim 6, wherein said communication device comprises an analog signal telephone device and wherein step (a) comprises placing said first call to a communication port of said test device from said analog signal telephone device.

8. A method according to claim 6, wherein said communication device comprises a data terminal device and wherein step (a) comprises placing said first call to a communication port of said test device from said data terminal device.

9. For use with a communication circuit having a message-waiting class of service provided by a communication network in which said communication circuit is installed, a method of testing the ability of a communication unit coupled to said communication circuit to generate an output representative of the exercise of said message-waiting class of service, comprising the steps of:

(a) placing a first call to a test device, installed in said communication network, by way of a communication device that has been coupled to said telephone circuit;

(b) upon said first call being placed, causing said test device to transmit a message to said communication circuit that causes said communication unit to generate an output representative of an exercise of said message-waiting class of service; and (c) monitoring the operation of said communication unit for generation thereby of said output representative of said message-waiting class of service.

10. A method according to claim 9, wherein said communication unit includes a visual indicator which is energized in response to said communication unit receiving a message-waiting signal by way of said communication network, and wherein step (b) comprises causing said test device to transmit a first message to said communication circuit that signals said communication unit to turn on said visual indicator.

11. A method according to claim 10, wherein step (b) further comprises causing said test device to transmit a second message to said communication circuit that signals said communication unit to turn off said visual indicator.

12. A test device installable in a communication network and being controllably accessible by way of a communication device that is coupled to a communication circuit of said communication network, said test device comprising:

a first communication port and a second communication port coupled to said communication network; and a communication transceiver coupled to said first and second communication ports and being operative to transmit and receive telecommunication signals over said communication network, said communication transceiver including a call supervision computer, which is programmed to cause said communication transceiver to interface signals which are effective to test the operation of said communication circuit by way of either of said first and second communication ports, and wherein said communication circuit is provided with caller identification, call-waiting class of service, and wherein said call supervision computer is programmed to test the ability of said communication circuit to exercise said caller identification, call-waiting class of service by causing said communication transceiver to place respective calls to said communication circuit via said first and second communication ports of said test device.

13. A test device according to claim 12, wherein said call supervision computer is programmed to cause said communication transceiver to interface said signals which are effective to test the operation of said communication circuit by way of each of said first and second communication ports.

14. A test device according to claim 12, wherein said call supervision computer is programmed to test the ability of said communication circuit to test said caller identification, call-waiting class of service by performing a test routine comprising the steps of:

(a) in response to receiving an incoming call placed from said communication circuit to said first communication port of said test device, detecting the telephone number of said communication circuit; and (c) in response to said communication device answering said first outgoing call of step (b), placing a second outgoing call from said communication transceiver by way of said second communication port to said communication circuit, said second outgoing call containing information identifying said test device, so as to exercise said caller identification, call-waiting class of service of said communication circuit.

15. A test device according to claim 14, wherein said first outgoing call contains information representative of a telephone number associated with said first communication port of said test device, and wherein said second outgoing call contains information representative of a telephone number associated with said second communication port of said test device.

16. A test device installable in a communication network and being controllably accessible by way of a communication device that is coupled to a communication circuit of said communication network, said test device comprising:

a first communication port and a second communication port coupled to said communication network; and a communication transceiver coupled to said first and second communication ports and being operative to transmit and receive telecommunication signals over said communication network, said communication transceiver including a call supervision computer, which is programmed to cause said communication transceiver to interface signals which are effective to test the operation of said communication circuit by way of either of said first and second communication ports, and wherein said communication circuit has a message-waiting class of service, and wherein said call supervision computer is programmed to test the ability of a communication unit coupled to said communication circuit to generate an output representative of the exercise of said message-waiting class of service by performing a test routine that comprises the steps of:

(a) in response to receiving an incoming call placed from said communication device to said first port of said test device, detecting the telephone number of said communication circuit; and (b) during the course of said incoming call, transmitting a message to said communication circuit that causes said communication unit to generate an output representative of an exercise of said message-waiting class of service, so that the operation of said communication unit may be monitored for the generation of said output representative of said message-waiting class of service.

17. A test device according to claim 16, wherein said communication unit includes a visual indicator which is energized in response to said communication unit receiving a message-waiting signal by way of said communication network, and wherein step (b) of said second routine comprises causing said test device to transmit a first message to said communication circuit that signals said communication unit to turn on said visual indicator.

18. A test device according to claim 16, wherein step (b) of said second routine further comprises causing said test device to transmit a second message to said communication circuit that signals said communication unit to turn off said visual indicator.

19. A test device installable in a communication network and being controllably accessible by way of a communication device that is coupled to a communication circuit of said communication network, said test device comprising:

a first communication port and a second communication port coupled to said communication network;

a communication transceiver coupled to said first and second communication ports and being operative to transmit and receive telecommunication signals over said communication network, said communication transceiver including a call supervision computer, which is programmed to cause said communication transceiver to interface signals which are effective to test the operation of said communication circuit by way of either of said first and second communication ports, and wherein said call supervision computer is programmed to test the ability of a communication circuit to receive calls by performing a first test routine that comprises the steps of:

(a) receiving an incoming call placed by way of said communication device; and (b) after termination of said incoming call, invoking a call return operation through said telephone network, whereby a return call is placed from said test device to said communication circuit as a called party, so that said return call may be monitored by way of said communication device for the presence of caller identification information contained therein identifying said test device.

20. A test device according to claim 19, wherein said communication device comprises an analog signalling telephone device.

21. A test device according to claim 19, wherein said communication device comprises a data terminal device.

22. A test device according to claim 19, wherein said call supervision computer is programmed to test the ability of said communication circuit to test said caller identification, call-waiting class of service by performing a second test routine comprising the steps of:

(c) in response to receiving an incoming call placed from said communication circuit to said first communication port of said test device, detecting the telephone number of said communication circuit; and (d) in response to said communication device answering said first outgoing call of step (c), placing a second outgoing call from said communication transceiver by way of said second communication port to said communication circuit, said second outgoing call containing information identifying said test device, so as to exercise said caller identification, call-waiting class of service of said communication circuit.

23. A test device according to claim 22, wherein said first outgoing call contains information representative of a telephone number associated with said first communication port of said test device, and wherein said second outgoing call contains information representative of a telephone number associated with said second communication port of said test device.

24. A test device according to claim 22, wherein said communication circuit has a message-waiting class of service, and wherein said call supervision computer is programmed to test the ability of a communication unit coupled to said communication circuit to generate an output representative of the exercise of said message-waiting class of service by performing a third test routine that comprises the steps of:

(e) in response to receiving an incoming call placed from said communication device to said first port of said test device, detecting the telephone number of said communication circuit;

(f) during the course of said incoming call, transmitting a message to said communication circuit that causes said communication unit to generate an output representative of an exercise of said message-waiting class of service, so that the operation of said communication unit may be monitored for the generation of said output representative of said message-waiting class of service.

25. A test device according to claim 24, wherein said communication unit includes a visual indicator which is energized in response to said communication unit receiving a message-waiting signal by way of said communication network, and wherein step (f) of said second routine comprises causing said test device to transmit a first message to said communication circuit that signals said communication unit to illuminate said visual indicator.

26. A test device according to claim 24, wherein step (f) further comprises causing said test device to transmit a second message to said communication circuit that signals said communication unit to turn off said visual indicator.

27. A test unit installable in a communication network and being controllably accessible by way of a communication device that is coupled to a communication circuit of said communication network, said test unit comprising:

a first communication port for interfacing first communication channel signals with said communication network and a second communication port for interfacing second communication channel signals with said communication network; and a communication transceiver coupled to said first and second communication ports and being operative to transmit and receive communication signals over said communication network, said communication transceiver including a call supervision computer, which is programmed to cause said communication transceiver to interface communication signals which are effective to test the operation of said communication circuit by way of either or both of said first and second communication ports, and wherein said first and second communication ports have respectively associated telephone numbers.

28. A test unit according to claim 27, wherein said call supervision computer is programmed to cause said communication transceiver to interface said signals which are effective to test the operation of said communication circuit by way of each of said first and second communication ports.

29. A test unit according to claim 27, wherein said call supervision computer is programmed to cause said communication transceiver to interface said signals which are effective to test the operation of said communication circuit by voice channel signals coupled with said first communication port.

30. A test unit according to claim 27, wherein said call supervision computer is programmed to cause said communication transceiver to interface said signals which are effective to test the operation of said communication circuit by data channel signals coupled with said second communication port.

31. A test unit installable in a communication network and being controllably accessible by way of a communication device that is coupled to a communication circuit of said communication network, said test unit comprising:

a first communication port for interfacing first communication channel signals with said communication network and a second communication port for interfacing second communication channel signals with said communication network; and a communication transceiver coupled to said first and second communication ports and being operative to transmit and receive communication signals over said communication network, said communication transceiver including a call supervision computer, which is programmed to cause said communication transceiver to interface communication signals which are effective to test the operation of said communication circuit by way of either or both of said first and second communication ports, and wherein said communication transceiver includes a caller ID detection circuit, which is controllably coupled to one of said first and second communication ports by the operation of said supervision computer inserted during reception of caller ID signalling information accompanying ringing signals of an incoming call to said one of said first and second communication ports of said test unit.

32. A test unit according to claim 31, wherein said communication transceiver further includes a modem having a data input port and a data output port, first and second hybrid units respectively coupled with said first and second communication ports, and first and second computer-controlled switches arranged to controllably couple the data input and output ports of said modem to said first and second hybrid units.

33. A test unit according to claim 32, wherein said first computer-controlled switch is arranged to provide connectivity between said data input port of said modem and said caller ID detection circuit during reception of caller ID signalling information accompanying ringing signals of an incoming call to said one of said first and second communication ports of said test unit.

34. A test unit according to claim 33, wherein said test unit is operative to conduct testing of a telephone circuit from which a call to said test unit may be placed, including exercising a caller identification, call waiting class of service of said telephone circuit.

35. A test unit according to claim 33, wherein said test unit is operative to conduct testing of a telephone circuit from which a call to said test unit may be placed, including testing the ability of said telephone circuit to receive incoming calls.

36. A test unit according to claim 33, wherein said test unit is operative to conduct testing of a telephone circuit from which a call to said test unit may be placed, including testing the operation of a message-waiting indicator of a telephone unit coupled to the telephone circuit.

37. A test unit according to claim 33, wherein said test unit is operative to download all caller ID signalling information accompanying ringing signals of an incoming call to said test unit by means of a data channel established between a remote terminal and said second communication port of said test unit.

* * * * *